April 22, 1952  H. M. JENSEN ET AL  2,594,173
VALVE
Filed Sept. 30, 1944  2 SHEETS—SHEET 1
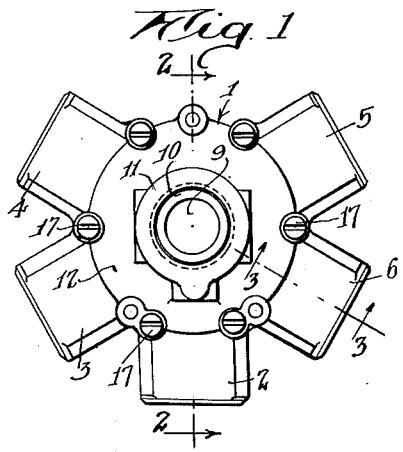
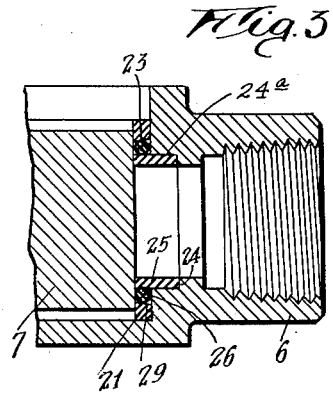
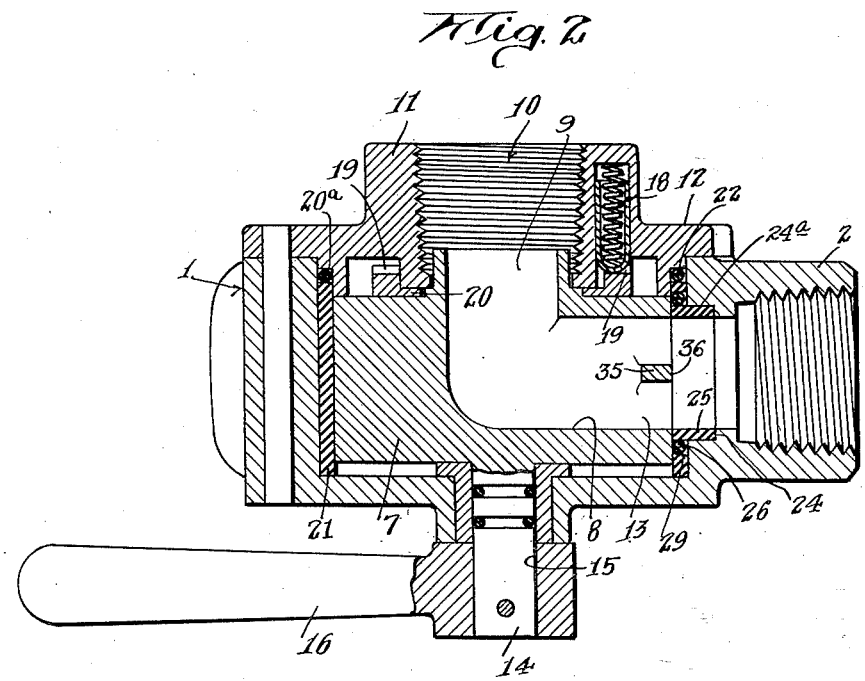
Inventors
Harold K. Bouvier
Hubert M. Jensen
By Lyon & Lyon
Attorneys April 22, 1952  H. M. JENSEN ET AL  2,594,173
VALVE
Filed Sept. 30, 1944  2 SHEETS—SHEET 2

NORMAL POSITION OF RUBBER SEAL WITHOUT PRESSURE

PRESSURE FLOW

PRESSURE FLOW

Inventors
Harold K. Bouvier
Hubert M. Jensen
By Lyon & Lyon
Attorneys

Patented Apr. 22, 1952

2,594,173

UNITED STATES PATENT OFFICE 2,594,173

VALVE

Hubert M. Jensen, Inglewood, and Harold Karl Bouvier, Los Angeles, Calif., assignors, by mesne assignments, to Century Aircraft Co., Inglewood, Calif., a co-partnership consisting of Gladys Lois Henry and J. Fred Henry, West Los Angeles, Calif., and John M. Henry, Encino, Calif.

Application September 30, 1944, Serial No. 556,526

16 Claims. (Cl. 251—113)

1

This invention relates to valves, and is more particularly directed to a valve adapted for use in the handling of high pressure volatile fluids. My invention, although not limited in its applicability to such use is particularly applicable for use in a fuel system in an aeroplane and in this form constitutes a selector valve for controlling the flow of fuel from the different tanks upon such aircraft to the motors of the aircraft. In such application the valve is positioned in a flow line of extremely volatile, extremely inflammable fuel and must therefore operate without leakage and as it is only intermittently operated in such position, must be in such form as will not stick in its selected positions.

This invention is particularly directed to the formation of a valve including a rotor mounted in a casing, which casing has a plurality of flow passages the flow to or from which is controlled through the medium of a selector passage formed in the rotor.

It is an object of this invention to provide a rotary selector valve wherein means are provided for effectively packing the rotor within its housing so as to maintain the flow of fluid without leakage through the selected path provided between the rotor and its case and the fluid flow passage of the case or housing selected.

Another object of this invention is to provide a valve which includes a valve body and a rotor which is mounted within the body and which body is formed with a fluid flow branch adapted to be aligned with a flow passage formed in the rotor and wherein means are provided for packing the rotor to the body to confine flow through the said passages.

Another object of this invention is to provide a rotary valve which includes a body and a rotor defining a flow passage through the valve and wherein means are provided for packing the rotor to the body which includes a liner positioned between the body and the rotor, a sleeve positioned in the body passage and a packing element interposed between the liner and sleeve and adapted to be expanded under fluid pressure passing through the passage formed between the body and the rotor to confine flow to such passage.

Other objects and advantages of this invention it is believed will be apparent from the following detailed description of a preferred embodiment thereof as illustrated in the accompanying drawings.

In the drawings:

Figure 1 is a face view of the rotary valve embodying my invention.

2

Figure 2 is a mid-section view taken substantially on the line 2—2 of Figure 1.

Figure 3 is a fragmental sectional view taken substantially on the line 3—3 of Figure 1 and being a mid-section actually through one of the branches of the housing or casing.

Figure 4:
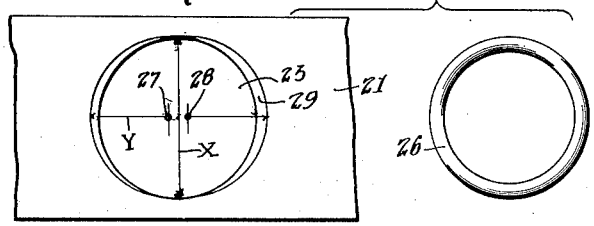
Figure 4 is an elevation of the liner.

In the preferred embodiment of my invention as illustrated in the accompanying drawings, I indicates a body which has a plurality of flow branches 2, 3, 4, 5 and 6 formed around its periphery. Mounted within the body I is a selector rotor 7 which has a flow passage 8 formed therein whereby the position of the rotor 7 within the body I determines through which of the body branches flow occurs. As herein illustrated, the rotor 7 has an axial port 9 which aligns with the axial passage 10 formed through the branch 11 of the cover plate 12 of the housing. The axial port 9 branches radially as indicated at 13 in the rotor 7 and terminates at the periphery of the rotor in position of alignment with any one of the flow passages formed through the body branches and dependent upon position of rotation of the selector rotor 7.

The rotor 7 has a spindle 14 which extends through a spindle opening 15 formed in the body I and is adapted to be suitably packed therein. A handle 16 is secured to the spindle 14 exterior of the body I and provides the means for rotating the rotor 7.

The cover plate 12 is adapted to be secured to the body I through the medium of a plurality of cap screws 17. The cover plate 12 is formed with a selector index pin 18 which is adapted to fit within any one of the grooves 19 formed in the selector ring 20 carried by the rotor 7 thereby to yieldably retain the rotor in the selected position of alignment with the selected flow branch of the body I. The selector pin is mounted within the cover plate 12 and is spring-urged into position to engage within its selected groove 19.

A packing ring 20ᵃ of a suitable material such as an oil-resistant rubber, is seated upon the liner 21 to engage the annular shoulders 22 of the plate 12 which fits within the bore of the body 1, thereby connecting the plate 12 with the body 1 in fluid-tight relation.

Means are provided for selectively packing the rotor with relation to the flow passage formed through the selected branch of the body 1 and which means are preferably of the following construction:

Positioned between the rotor 7 and the body 1 is the liner 21 and the liner 21 has a flow opening 23 formed in position to correspond with the flow passage formed through each of the body branches. Each of the body branches is as illustrated in the Figure 3 provided with a radial bore 24a terminating in an inwardly facing shoulder 24. A rigid sleeve 25 is insertable into the bore 24a from the interior of the body 1 and is supported and aligned by the bore 24a. The outer end of the sleeve rests against the shoulder 24. The openings 23 of the liner 21 are of greater diameter than the exterior diameter of the packing sleeve 25. Mounted within each opening 23 is a packing ring 26 formed of soft oil-resistant rubber such as any of the well known types of oil-resistant synthetic rubber or other suitable flexible packing material.

As illustrated in Figure 4, the openings 23 formed in the liner 21 are of greater length in the direction of peripheral travel of the rotor 7 than they are in height. To illustrate the manner of original formation of these openings 23, they may be described as having been formed by boring the liner with the drill positioned upon two spaced centers 27 and 28 so that the height of the openings 23 as indicated at X in Figure 4 is the diameter of the drill, while the length of the openings 23 indicated at Y in Figure 4 is the diameter of the drill plus the spacing of the two centers 27 and 28. This produces an angled undercutting of the opening 23 as indicated at 29 in Figure 3 practically around the entire opening 23. The drilling from the centers 27 and 28 is initially carried out with the sides of the drills positioned radially of the liner 21 to produce this undercut shoulder 29.

The packing ring 26 may be of any suitable cross section but I prefer to employ a ring which is initially round in cross section when under no compressive force. The diameter of this ring 26 corresponds substantially with the height X of the opening 23 and is therefore less than the length Y of the said opening 23. The internal diameter of the packing ring 26 is materially greater than the external diameter of the sleeve 25. With this construction the packing rings 26 may be inserted in the openings 23 of the liner 21 with the liner 21 in position within the body and the undercut shoulder 29 will retain the said packing rings in position. The sleeves 25 may then be positioned in the rings to engage their stop seats 24 formed in the branches of the body 1. The inner ends of the sleeves 25 are machined to fit the periphery of the rotor 7 as indicated at 30. The rotor may then be mounted within the body 1 without danger that the packing rings 26 or sleeves 25 becoming dislodged from their required position. The packing ring 20a may be then positioned against the edge of the liner 21 and the cover plate 12 may be then secured to the body.

A bridge 35 is provided across the entrance to the flow pipe 8 and has its outer surface 36 coincident with the outer cylindrical surface of the rotor 7. The bridge 35 is proportioned to present very little restriction to flow. Bridge surface 36 contacts the sealing rings 26 to prevent their accidental displacement from their respective openings 23 in the liner 21 during the interval while the rotor 7 is being turned.

Figure 5:
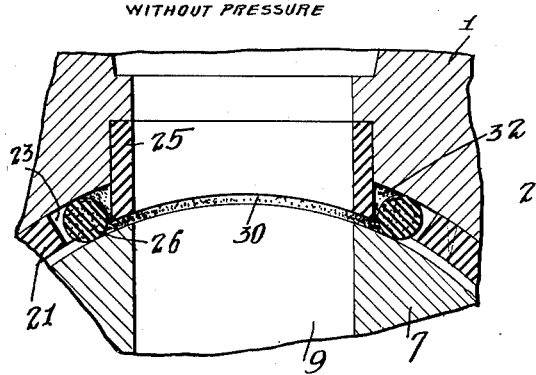
Figure 5 is a diagrammatic section of a rotor and housing illustrating conditions where there is no flow through the valve.
Figure 6:
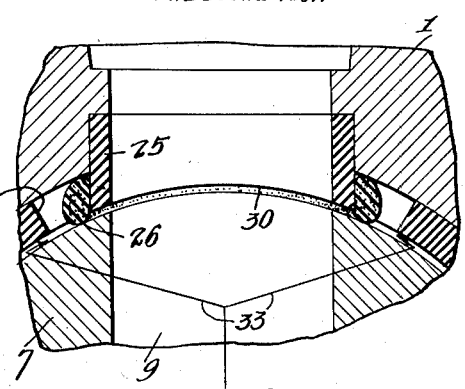
Figure 6 is a similar diagrammatic view illustrating the condition where the pressure flow is in a direction to induce leakage in the direction around the rotor toward the discharge passage of the housing or case.
Figure 7:
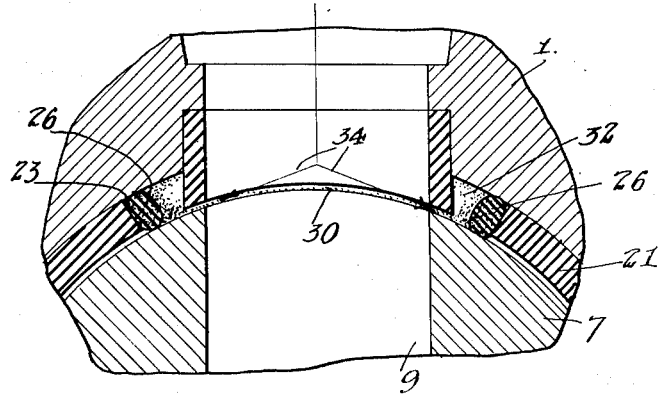
Figure 7 is a similar view illustrating the conditions existing upon a reverse from that illustrated in Figure 6.

The mode of operation of the packing ring embodied in this invention is specifically illustrated in Figures 5, 6 and 7. As herein illustrated, the rotor 7 is rotated to a selective position in alignment with the passage formed through one of the branches of the body 1.

In Figure 5 I have illustrated the condition of no flow where the packing ring 26 is floating freely within the packing ring annulus 32 formed between the liner 21, the sleeve 25, body 1 and the rotor 7.

In Figure 6 I have illustrated the condition where there is a tendency toward leakage in a direction indicated by the arrows 33 which might be a condition of reduced pressure in the flow line established through the branch passage and rotor passages of the valve. In this condition the pressure exerted around the periphery of the rotor 7 acts to compress the packing ring 26 against the sleeve 25, the inner surface of the body 1, and the outer periphery of the rotor 7, thereby forming an effective seal under fluid pressure.

In Figure 7 I have illustrated the condition of reverse flow or reverse pressure application where the flow of high pressure fluid is passing through the branch of the body 1 and into the passage or port formed in the rotor 7. In this condition the pressures of the fluid which act in the direction indicated by the arrows 34 on the periphery of the rotor 7 and which act to compress the packing ring 26 between the inner wall of the opening 23 formed in the liner 21, the inner periphery of the body and the outer periphery of the rotor 7 form an effective pressure seal.

It is particularly important to note that under conditions of no flow or pressure as indicated in Figure 5, that the packing ring 26 is free floating and exerts no resistance to the free rotation of the rotor 7 and therefore would not tend to bind even under conditions of corrosion of the rotor 7 so that it could not be freely rotated to select the desired passage through the valve; also that the ring 26, being free-floating, will respond immediately to conditions of flow established through the valve to effect an immediate seal under the pressure exerted and in the desired direction of flow.

Having fully described our invention, it is to be understood that we do not wish to be limited to the details herein set forth, but our invention is of the full scope of the appended claims.

We claim:

1. In a rotary valve, the combination of a valve body, a rotor mounted within the body, the body having a flow branch and the rotor having a fluid passage communicating with the flow branch, a liner positioned between the body and the rotor, the liner having a cut-out of greater diameter than the diameter of the branch, a deformable packing ring mounted in the cut-out and having a diameter approximately corresponding with the diameter of the cut-out, a rigid sleeve supported in a bore provided within the branch and having an external diameter less than the internal diameter of the packing ring, and the sleeve extending into the branch at one end and extending through the ring at its opposite end.

2. In a rotary valve, the combination of a valve body, a rotor mounted within the body, the body having a fluid passage branch and the rotor having a fluid passage communicataing with the branch passage, the branch having a radial bore, a liner positioned between the rotor and the body and having a fluid passage opening for the passage of fluid between the branch and rotor passages, the periphery of the opening being substantially circular on the rotor side and being elongated in the direction of linear movement of the rotor surface on the body side, a rigid sleeve mounted in the radial bore and extending into the said opening, and a packing ring mounted within the opening surrounding the sleeve and having an external diameter approximately the same as the lesser dimension of the said liner opening.

3. In a rotary valve, the combination of a valve body, a rotor mounted within the body, the body having a plurality of fluid passage branches, each branch having a bore, the rotor having a fluid passage, means for rotating the rotor to establish communication between the rotor fluid passage and the fluid passage through any of said branches, and a means of packing the rotor with relation to any of said branches including a liner positioned between the rotor and the body, said liner having a fluid passage opening for the passage of fluid between the said branch and rotor passages, the opening being of greater size than the branch passage, a rigid sleeve mounted in the bore and extending into the liner to define with the liner, rotor and body a packing chamber, and a packing ring loosely mounted in the passage surrounding the sleeve.

4. In a rotary valve, the combination of a valve body having a fluid passage formed through the valve body, a rotor mounted in the valve body and having a fluid passage formed therein, means for rotating the rotor so that fluid may pass between said passages and means for packing the rotor with the body to confine flow of fluid to the said passages, said packing means including a liner surrounding the rotor and having an opening therein of greater diameter than the passages, a sleeve independently mounted within the body passage to define with the body, rotor and liner a packing chamber, and a compressible packing means mounted within the chamber and surrounding the sleeve.

5. In a rotary valve, the combination of a valve body, a rotor mounted within the body, the body having a fluid flow branch and the rotor having a fluid passage, means for rotating the rotor to bring its fluid passage into position in alignment with the full flow branch, and packing means for packing the rotor to the body in said position, said packing means including a liner having an under-cut opening in alignment with and of greater diameter than the passage provided between the rotor and fluid flow branch, the fluid flow branch having a cylindrical bore, a sleeve mounted in the bore and extending into the liner opening to define with the body, rotor and liner an annular packing space, a compressible packing ring mounted in the annulus to float freely therein, the under-cut opening being shaped to form a shoulder capable of retaining the packing ring in position.

6. In a rotary valve, the combination of a valve body, a rotor mounted within the body, the body and rotor having aligned fluid passages, the body passage including a radial bore, and means for packing the rotor to the body around said aligned fluid passages comprising a liner positioned between the body and the rotor, a rigid sleeve positioned in the body bore and extending through the liner to the rotor defining with the rotor body and liner an annular packing space, and a compressible packing ring mounted within the annulus to float freely therein.

7. In a valve, the combination of a body having a fluid flow branch, a valve element mounted within the body and having a flow passage, the body passage including a radial bore, a liner positioned between the body and the valve element and having a flow opening, a sleeve positioned in the radial bore and extending into the flow opening formed in the liner, the opening in the liner being of a dimension sufficiently greater than the exterior diameter of the sleeve to provide an annular space around the sleeve of greater cross-sectional area than the cross-sectional area of a flexible packing element mounted within said annular space whereby the packing element is free floating within the annular space and adapted to be compressed by fluid pressure within the valve to confine flow to the passages formed in the body and valve element.

8. In a rotary valve, the combination of a valve body, a rotor mounted within the body, the body and rotor having aligned fluid passages, the body passage including a radial bore, means for establishing a fluid seal between the body and the rotor at the junction of said aligned fluid passages, said means including an annular liner positioned between the body and the rotor and provided with a lateral opening in alignment with said passages, a sleeve received within the radial bore and extending into the liner opening to define with the body, rotor and liner an annular packing space, a deformable packing ring mounted in the packing annulus and adapted to expand circumferentially into sealing engagement with the liner, body and rotor upon admission through the sleeve of a fluid under pressure.

9. In a rotary valve, the combination of a valve body, a rotor mounted within the body, the body and rotor having aligned fluid passages, means for establishing a fluid seal between the body and the rotor at the junction of said aligned fluid passages, said means including an annular liner positioned between the body and the rotor and provided with a lateral opening in alignment with said passages, said lateral opening being of larger dimensions than the said fluid passages and being bounded by a continuous curvilinear surface, the surface being radial at four peripheral points of equal angular spacing and being of substantially minimum width between said four peripheral points, and a deformable annular packing ring positioned in said opening and adapted to expand circumferentially into sealing engagement with said curvilinear surface, body and rotor.

10. In a selector valve having a ported body and a ported rotor, the combination of concentric cylindrical sealing surfaces on the body and rotor, an annular liner between said cylindrical surfaces and provided with an opening communicating with a port in the body and a port in the rotor, the opening being bounded by a continuous curvilinear surface the surface being radial at four peripheral points of equal angular spacing and being of substantially minimum width between said four peripheral points, and an annular packing ring positioned in said opening, said packing ring being expandable by fluid pressure into contact with said curvilinear surface and deformable into sealing engagement with said body and rotor sealing surfaces.

11. A liner ring to encircle the rotor of a selector valve, comprising an annular wall defined by inner and outer concentric cylindrical surfaces, a lateral opening through the wall, said opening being bounded by a continuous curvilinear surface the surface being radial at four peripheral points of equal angular spacing and being of substantially minimum width between said four peripheral points.

12. In a selector valve having a ported body and a ported rotor, the combination of concentric cylindrical sealing surfaces on the body and rotor, an annular liner between said cylindrical surfaces and provided with an opening communicating with a port in the body and a port in the rotor, the body port including a radial bore, a stationary sleeve mounted in the radial bore in the body and projecting into said liner opening, an annular packing ring positioned in said opening and encircling the sleeve, said packing ring being adapted to be contracted by fluid pressure into contact with said sleeve and deformed into sealing engagement with said body and rotor sealing surfaces.

13. In a rotary valve, the combination of a valve body, a rotor mounted within the body, the body and rotor having aligned fluid passages, packing means secured relative to the body for establishing a fluid seal between the body and the rotor at the junction of said aligned fluid passages, and a bridge across the entrance to the rotor passage adapted to contact said packing means when the rotor is turned to prevent its displacement from operative position.

14. In a rotary valve, the combination of a valve body, a rotor mounted within the body, the body and rotor having aligned fluid passages, means secured relative to the body including an annular deformable ring for establishing a fluid seal between the body and the rotor at the junction of said aligned fluid passages and a bridge formed across the entrance to the rotor fluid passage adapted to contact said ring when the rotor is turned to prevent its displacement from operative position.

15. In a rotary valve, the combination of a valve body, a rotor mounted within the body, the body and rotor having aligned fluid passages, means for establishing a fluid seal between the body and the rotor at the junction of said aligned fluid passages, said means including an annular liner positioned between the body and the rotor and provided with a lateral opening in alignment with said passages, said lateral opening being of larger dimensions than the said fluid passages, a deformable annular packing ring positioned in said opening, and a bridge formed across the entrance to the rotor fluid passage adapted to contact said ring when the rotor is turned to prevent its displacement from operative position.

16. A liner ring to encircle the rotor of a selector valve, comprising an annular wall defined by inner and outer concentric cylindrical surfaces, a lateral opening through the wall, said opening being bounded by a continuous curvilinear surface which has radially extending portions at circumferentially spaced locations and which opening has a substantially circular periphery on said inner cylindrical surfaces of the annular wall.

HUBERT M. JENSEN.
HAROLD KARL BOUVIER.

REFERENCES CITED

The following references are of record in the file of this patent:

UNITED STATES PATENTS

| Number | Name | Date |
|---|---|---|
| 1,653,369 | Murphy | Dec. 20, 1927 |
| 2,180,795 | Christensen | Nov. 2, 1939 |
| 2,210,335 | Mueller | Aug. 6, 1940 |
| 2,290,349 | Ohls | July 21, 1942 |
| 2,314,683 | Berry | Mar. 23, 1943 |
| 2,310,583 | Johnson | Feb. 9, 1943 |
| 2,373,925 | Townhill | Apr. 17, 1945 |

FOREIGN PATENTS

| Number | Country | Date |
|---|---|---|
| 520,188 | Germany | Feb. 19, 1931 |